ELECTRONIC RIPPLE FILTER
Filed Dec. 5, 1968
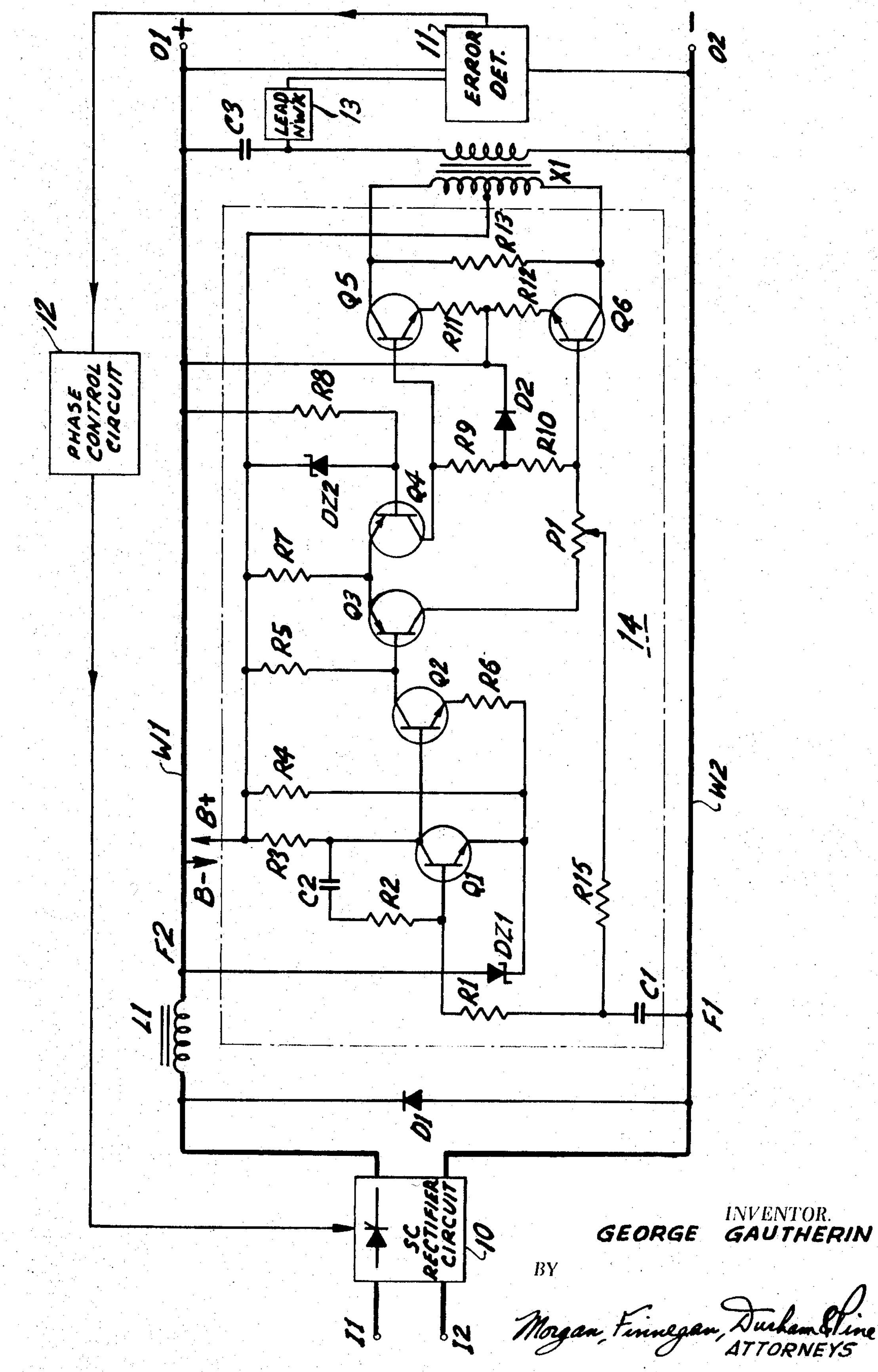
INVENTOR.
GEORGE GAUTHERIN
BY
Morgan, Finnegan, Durham & Pine
ATTORNEYS 3,551,780
ELECTRONIC RIPPLE FILTER George A. Gautherin, Woodside, N.Y., assignor to Lambda Electronics Corporation, Huntington, N.Y., a corporation of New York
Filed Dec. 5, 1968, Ser. No. 781,441
Int. Cl. H02m *1/14*
U.S. Cl. 321—10 9 Claims

ABSTRACT OF THE DISCLOSURE

An electronic filtering system is disclosed which employs a dynamic electronic circuit to achieve filtering for D-C power supplies and thereby eliminates the need for large filtering capacitors in the output of the power supply. The filtering circuit, utilizing an amplifier in a negative feedback loop, develops a voltage across its output equal in magnitude but 180° out of phase with the ripple voltage developed across the output capacitor thereby yielding a substantial reduction in the net ripple across the output terminals of the supply.

This invention relates to electrical filters and is especially adapted for use in the output of electronic D-C power supplies employing switching devices for regulation.

One of the major objectives of a D-C power supply is to reduce the ripple in the D-C output of the supply. Typically this involves the use of filter capacitors. This technique is burdened in the case of power supplies which must be capable of supplying large load current. For example, in a power supply which delivers 500 amps at 10 volts, a capacitance totalling several farads would be necessary to provide the reduction of ripple required in many applications. To provide such a capacity would require tremendous bulk, much larger than the rest of the supply. Moreover, as individual capacitors are connected together to provide the total required capacitance, phase shift and resistance problems are encountered.

Alternatively, a large choke may also be used, as in a pi or L type filter, but in many applications, large choke magnitudes adversely affect response time and create problems of system loop stability.

A further factor in the use of capacitive filters in high current applications is the presence of real resistance in the capacitor. The use of a capacitor of say 0.3 farad, with a real resistance of 6 milliohms, will result in ripple in the order of 300 millivolts in a 60 Hz. 3 phase 100 volt, 50 amp supply. This is excessive for many applications.

It is accordingly an object of the invention to provide an electronic ripple filter which significantly reduces ripple, especially in high current applications, without the need for an excessive number of capacitors or a large or extra choke, or heavy duty transistors.

A further object of the invention is to provide such a filter which accomplishes its objectives without adversely affecting the stability of the supply.

A further object of the invention is to provide an improved power supply which achieves a high degree of ripple suppression.

Other objects and advantages of the invention will be set forth in part hereinafter and in part will be obvious herefrom, or may be learned by practice with the invention.

Serving to illustrate an exemplary embodiment of the invention is the drawing which is a schematic circuit diagram illustrating an illustrative embodiment of the invention.

In the illustrated embodiment an AC input is supplied at terminals I1 and I2. While a single phase supply is shown, the technique according to the invention is also applicable to polyphase supplies.

The AC input is applied to a rectifier circuit 10 illustratively of the type that employs silicon controlled rectifiers or other switching elements. The rectified output from circuit 10 is applied to leads W1 and W2, the latter being directly connected to output terminal O2 while the former includes an averaging choke L1 between the output of circuit 10 and the final output terminal O1. A flyback diode D1 is connected across the output terminals of the rectifier circuit.

Connected across output terminals O1 and O2 is an error detector circuit 11 which may include a divider, source of reference potential and error detector stage. The output of the error detector is connected to a phase control circuit 12, the output of which is connected in turn to the SCR circuit 10 to control the firing angle of the rectifier circuit switches, e.g., the SCR's to achieve regulation. This general organization of the supply is conventional and circuit details can be found in numerous power supply texts and handbooks.

The filtering arrangement according to the invention includes an amplifier 14 the input of which is connected across the output terminals O1 and O2 of the supply. One input, F1, is taken from output line W2 while the other input, F2, is connected to output lead W1. The output of amplifier 14 supplies the primary of a high turns ratio, step-down transformer X1 (e.g. 100:1), the secondary winding of which is connected in series with an output capacitance C3. That combination is connected across output terminals O1 and O2. Capacitance C3 is typically in the fractional farad range.

The general function of amplifier 14 is to supply a voltage across the secondary of X1 which cancels out the ripple voltage and its harmonics components appearing across output capacitance C3 so that, except for the small driving error, the net ripple voltage across the output terminals is nulled. Since the net input to amplifier 14 is the sum of the voltage drops across C3 and the secondary of X1, the amplifier functions to reduce this net voltage to a small value.

In the illustrated circuit, gains approaching 100 at the ripple frequency are attainable thereby producing a concomitant reduction of the ripple voltage by a factor of 100. Better performance is obtainable where larger output transformers are tolerable.

Physically, amplifier 14 may take the form of a small printed circuit board which together with the output transformer occupies substantially less space than that required by conventional filter arrangements. In one example a reduction to 10% of conventional filter size is attainable. Moreover none of the amplifier stages of the filter require a high rating nor mus tany of the stages carry load current.

In the illustrative embodiment, amplifier 14 includes a two stage DC amplifier embodying NPN transistors Q1 and Q2. The base-emitter circuit of Q1 is supplied with the amplifier input signal via a series RC network, R1, C1, connected between the base of Q1 and input terminal F1, and via a Zener diode DZ1 which connects the emitter of Q1 to terminal F2. It may be seen that these circuits connect the input of amplifier 14 to the supply output terminals O1, O2.

The collector of Q1 is connected to a source of B- potential via resistor R3 while the emitter is connected to the same source via resistor R4. A band pass limiting series network C2, R2 interconnects the base and collector of Q1.

The collector of Q1 is coupled to the base of Q2. The collector of Q2 is connected to B— via R5 while its emitter is connected to the emitter circuit of Q1 via R6.

The ouput of stage Q2 is coupled to a phase splitter Q3, Q4. This phase inversion circuit takes the form of two PNP transistors Q3 and Q4 having a common emitter resistor R7 connected to B—. The base of Q4 receives reference potential via a Zener diode DZ2 which connects the base to the B— supply. The base is also connected to input terminal F2 and supply output terminal O1 via a resistor R8.

The phase inverted outputs appearing at the collectors of Q3 and Q4 serve to drive a push-pull amplifier, Q5, Q6. The collector of Q4 is connected directly to the base of Q5 while the collector of Q3 is connected to the base of Q6 via potentiometer P1 which is adjusted to balance the output stage for the purpose of minimizing direct current in the primary of transformer X1. The arm of P1 is returned to the junction of R1 and C1 via resistor 15. The collector circuits of Q3 and Q4 are interconnected via resistors R9 and R10, the junction of which connects to input terminal F2 via a temperature compensating diode D2.

The emitters of Q5 and Q6 are interconnected via the series combination of resistances R11 and R12, the junction of which is also connected to terminal F2 and power supply output terminal O1.

The output stage energizes the primary of transformer X1 via direct connections from the collectors of Q5 and Q6; the center tap of the primary of X1 is connected to B— to supply the collector circuits of Q5 and Q6 while the entire primary is shunted by resistance R13. As noted previously, the feedback configuration of amplifier 14 functions to develop across the secondary of X1, a voltage which tends to cancel the ripple voltage appearing across output capacitor C3.

Amplifier 14 is temperature compensated and is preferably operated class AB. It produces a satisfactorily high gain at the relatively low ripple frequencies and harmonics thereof.

The electronic filter, if used in a straightforward manner, would complicate the problem of overall power supply stability by altering overall system response. This tendency is eliminated by connecting the lead network 13 normally employed with the error detector circuit 11 to the junction of C3 and the secondary of X1 as shown in the drawing. This causes the lead correction to be based on the response measured across C3 without being influenced by the effect of amplifier 14.

In the study and practice of the invention modifications will undoubtedly suggest themselves to the man skilled in the art. The invention is accordingly not limited to the specific circuit shown, but departures may be made therefrom without departing from the spirit and scope of the accompanying claims.

What is claimed is:

1. An electronic filter for a power supply having a rectifier circuit and output terminals for delivering a DC voltage comprising a ripple responsive impedance, an amplifier having an output circuit, the output circuit of said amplifier and said ripple impedance being serially connected across said output terminals, said amplifer including ripple voltage amplifying circuits for developing across its output circuit a ripple voltage substantially equal in magnitude but opposite in phase to the ripple voltage across said ripple impedance.

2. Apparatus in accordance with claim 1 in which said ripple impedance comprises a capacitance.

3. Apparatus in accordance with claim 1 in which said amplifier output circuit comprises a transformer.

4. Apparatus in accordance with claim 1 in which said supply includes an error detector circuit having a lead network, said lead network being connected to the junction of said amplifier output circuit and said ripple impedance.

5. Apparatus in accordance with claim 1 in which said amplifier has circuits for producing a substantial gain at the ripple frequency and harmonics thereof.

6. Apparatus in accordance with claim 1 in which said amplifier includes a DC input stage, a phase inverter and a push-pull output stage.

7. Apparatus in accordance with claim 3. in which said amplifier includes means for suppressing direct current in said transformer.

8. Apparatus in accordance with claim 1 in which said amplifier output circuit comprises a transformer and said ripple impedance comprises a capacitor connected in series with the secondary of said transformer.

9. Apparatus in accordance with claim 8 in which said transformer is a high turns ratio, step-down transformer.

References Cited

UNITED STATES PATENTS

| | | | |
|---|---|---|---|
| 2,751,548 | 6/1956 | Gunderson | 333—79X |
| 2,892,164 | 6/1959 | Woll | 333—79X |
| 3,229,184 | 1/1966 | Churchill | 321—10 |
| 3,317,819 | 5/1967 | Brodie | 321—10X |
| 3,371,269 | 2/1968 | Wattson | 321—10X |
| 3,395,317 | 7/1968 | Hanson | 321—10X |
| 3,474,346 | 10/1969 | Schaefer | 321—10X |

FOREIGN PATENTS

| | | | |
|---|---|---|---|
| 1,036,712 | 7/1966 | Great Britain | 321—9 |

OTHER REFERENCES

"Transistorized Filter for D.C. Power Supply," RCA Technical Notes, RCA TN No. 102 (333–79) March 1958.

"Power Transistor 'Ripple Clipper' Filter For High-Current D.C. Power Supply Use," Honeywell Application Notes, AN 4 Minneapolis-Honeywell Regulator Company, March 1959 (321–10).

WILLIAM M. SHOOP, Jr., Primary Examiner

U.S. Cl. X.R.

333—79